May 2, 1967   R. K. NORTON   3,317,334
COATING APPARATUS
Filed Dec. 30, 1959   3 Sheets-Sheet 1
FIG-1
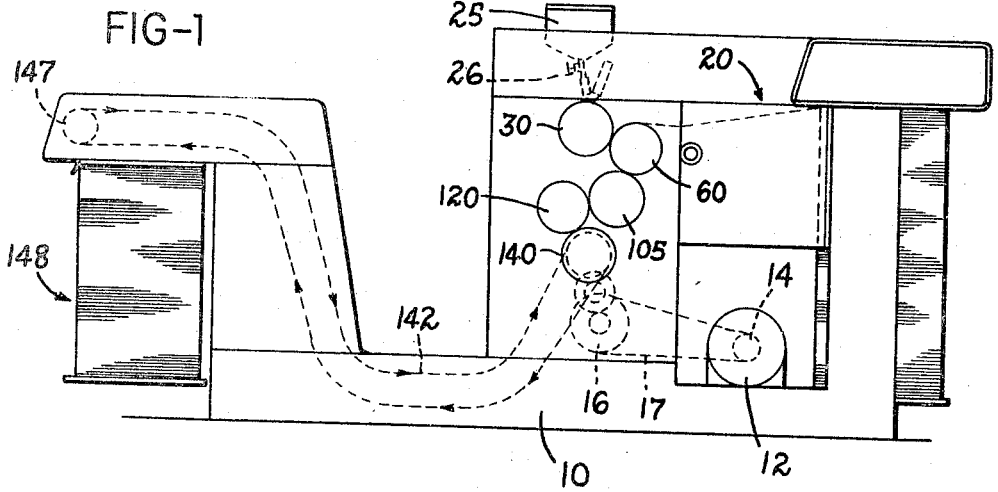
FIG-6
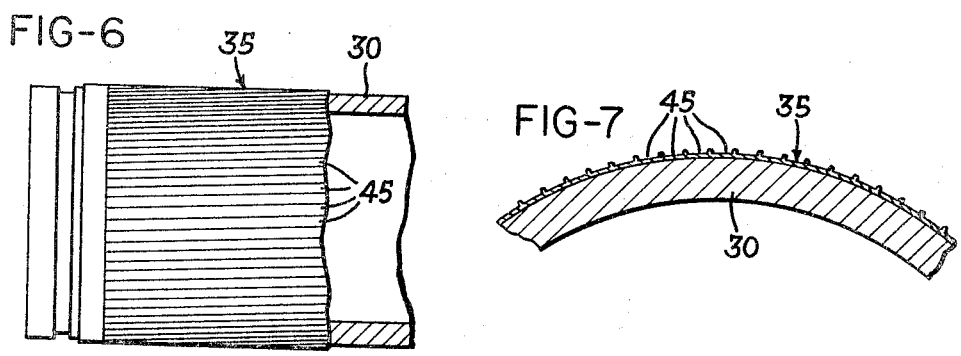
FIG-7
FIG-8
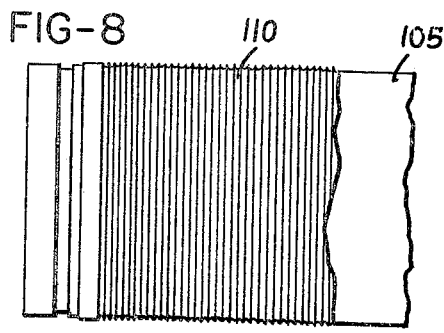
FIG-9
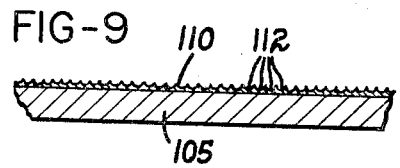
FIG-10
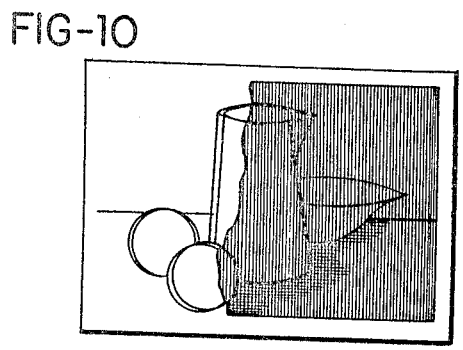
FIG-11
INVENTOR.
ROBERT K. NORTON
BY
Marechal, Biebel, French & Bugg
ATTORNEYS

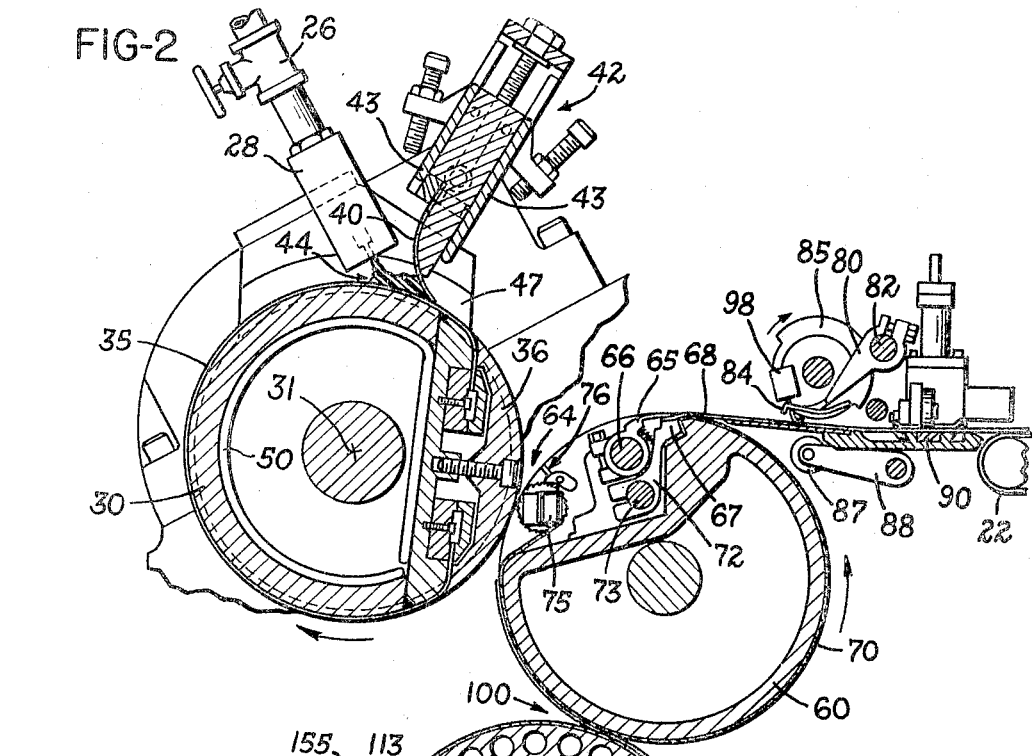
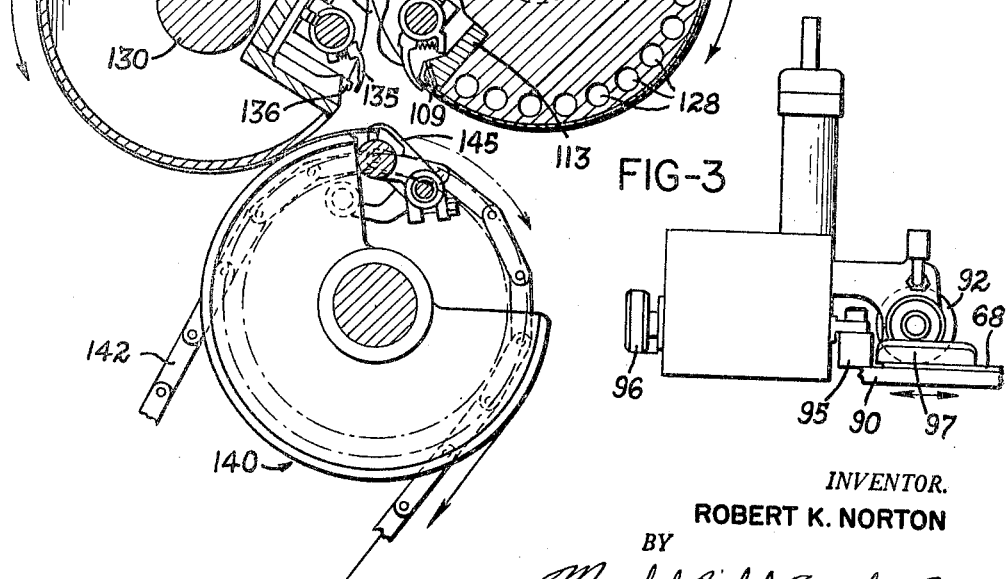

May 2, 1967
R. K. NORTON
3,317,334
COATING APPARATUS
Filed Dec. 30, 1959
3 Sheets-Sheet 3
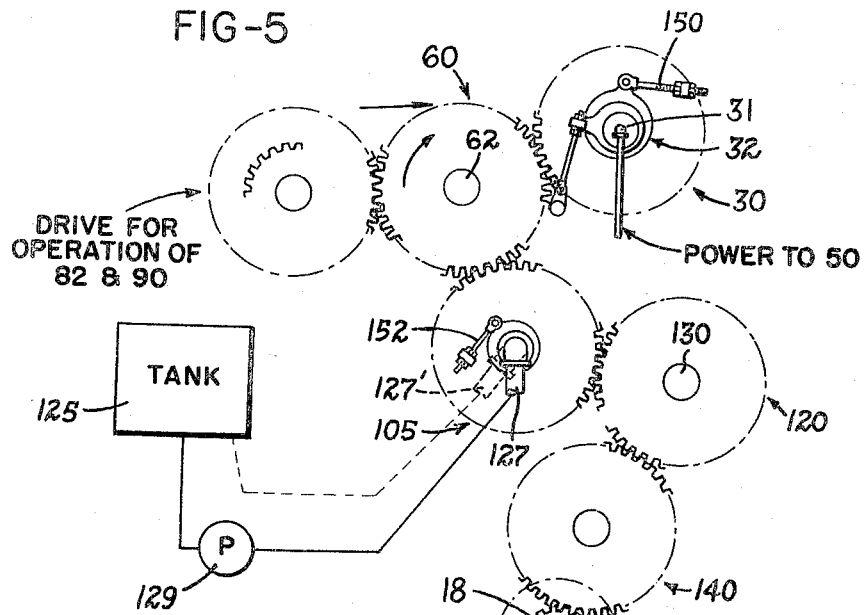
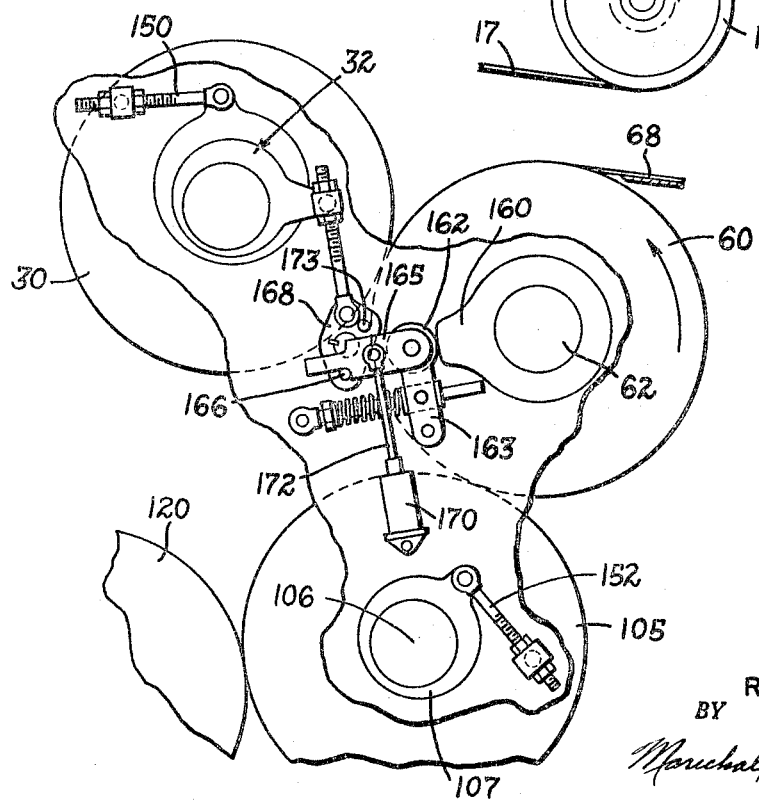
INVENTOR.
ROBERT K. NORTON
BY
Marechal, Biebel, French & Bugg
ATTORNEYS United States Patent Office 3,317,334
Patented May 2, 1967

3,317,334
COATING APPARATUS
Robert K. Norton, Twinsburg, Ohio, assignor to Harris-Intertype Corporation, Cleveland, Ohio, a corporation of Delaware
Filed Dec. 30, 1959, Ser. No. 862,897
17 Claims. (Cl. 117—10)

This application relates to apparatus for coating sheet material and the like.

The present invention is concerned primarily, although not exclusively, with coating predetermined areas of sheet material with substances of relatively high viscosity, and with proper register of the coated areas with respect to the sheets. One application of the features of this invention is in the field of lenticular coating. In this field a transparent coating is placed upon a printed picture or the like, and the coating is formed into parallel lenticulations in desired alignment with the picture such as to produce a three-dimensional effect to an observer when he views the picture with both eyes. Such coating lenticulations are known, as disclosed for example in the patents to Kanolt, 2,140,702, and to Van Benschoten, 2,290,656.

However, the present invention provides improved apparatus which is capable of performing coating operations with hot melt material at relatively great speed, with exact register of the lenticulations on the matter being coated, and setting the coating such that there is substantially no offset in the pile of completed sheets or other deformation of the coating which might otherwise reduce the effectiveness of the lenticular coating, as by altering the lens-like configuration of the individual lenticulations. The present invention, therefore, provides apparatus whereby selective coating may be accomplished readily and with such accuracy and rapidity that lenticular coated, i.e., "three-dimensional" pictures, photographs, etc., may be made available on a commercial basis.

Therefore, the primary object of this invention is to provide improved coating apparatus, particularly for coating flexible material such as paper and paperboard.

Another object of this invention is to provide improved apparatus for selective or spot coating on flexible sheet material.

Another object of this invention is to provide apparatus particularly adaptable for lenticular coating of sheet material which provides accurate register of the lenticulations on the material while maintaining a relatively high operating speed.

An additional object of this invention is to provide apparatus capable of applying different controllable thicknesses of coating material, for example up to several thousandths of an inch thick, particularly for applying lenticular coatings of uniform thickness.

A further object of this invention is to provide a hot melt coating machine wherein the viscous coating applied to the sheet material is chilled and thus set as the material passes through the apparatus to preserve a desired form of the coating as the material reaches the delivery end of the machine.

An additional object of this invention is to provide such a coating machine wherein individual sheets are moved through the machine rapidly and continuously and the coating is selectively applied to the sheets individually as a hot melt relatively viscous film which is chilled and thus set while the sheets are moving through the machine and prior to their passage to the delivery end of the machine.

Another object of this invention is to provide a machine as above described wherein selective coating is accomplished by a coating cylinder having a removable coating plate on the surface thereof provided with carrier depressions which can carry the coating material or melt and effect deposit of a predetermined quantity of the material in predetermined areas only of the sheet material.

Another object of this invention is to provide a coating machine such as described above wherein the surfacing cylinder carries a removable plate which may alternately have a smooth surface for chilling and ironing the coated areas, or may have an embossing surface which actually embosses a pattern in the coating as it is chilled.

Another object of this invention is to provide such a coating machine wherein the coating nip is located as nearly as possible to the transfer point between the impression and surfacing cylinders, and thereby to minimize cooling of the deposited coating before the surfacing operation.

A further object of the invention is to provide a coating machine as above described wherein the relative locations of the impression, surfacing, and transfer cylinders are such that maximum wrap is obtained about the surfacing cylinder, providing the greatest possible time of engagement between a given area of the coated sheet material and the cooled surfacing cylinder for optimum cooling and setting of the coating.

Another object of this invention is to provide a novel method of coating sheet materials, either in the form of individual sheets or a relatively long continuous web, and particularly a novel method of applying a transparent lenticular coating to such sheet materials.

Other objects and advantages of the invention will be apparent from the following description, the accompanying drawings and the appended claims.

In the drawings—

FIG. 1 is a somewhat schematic side view of a typical coating machine in accordance with the invention, showing the general configuration of the machine and the lay-out of the cylinders;

FIG. 2 is a view on an enlarged scale, taken from the same direction as FIG. 1, and showing details of the various cylinder constructions and related parts, with portions of some cylinders shown in section;

FIG. 3 is a view of a suitable side register mechanism such as shown in FIG. 2;

FIG. 4 is a view on essentially the same scale as FIG. 2, showing the pressure control apparatus which is connected to the three uppermost cylinders shown in FIG. 2, and which is normally mounted to the outside of the main frame of the machine;

FIG. 5 is a somewhat schematic view taken from the opposite side of the machine as seen in FIG. 1, and showing the drive train by which the various cylinders are rotated in synchronism;

FIG. 6 is a somewhat diagrammatic view of the coating cylinder, showing a portion of the coating plate mounted thereon;

FIG. 7 is an enlarged segmental sectional view taken through a portion of the coating cylinder and a coating plate as mounted thereon;

FIG. 8 is a view similar to FIG. 6 showing the surfacing cylinder with a lenticular surfacing or embossing plate mounted thereon;

FIG. 9 is an enlarged segmental view similar to FIG. 7 showing a portion of the surfacing cylinder and the plate mounted thereon;

FIG. 10 is a view of a printed sheet, showing a portion of the sheet with an applied lenticular coating which results in development of a three-dimensional view; and FIG. 11 is a section on an enlarged scale through a segment of FIG. 10 showing the appearance of the lenticular coating upon the printed sheet.

Referring to the drawings, which illustrate a preferred embodiment of the invention, the machine includes a base member 10 housing a drive motor 12 which is adapted to drive the apparatus through an output pulley 14 and a main drive pulley 16 connected by a belt 17. The various cylinders of the machine are shown diagrammatically in FIG. 1 to emphasize their relationship to each other and to the feed and delivery mechanisms. Details of the interconnecting drive gears between the cylinders, which are well known, for example, in the printing press art, are shown in FIG. 5. It is understood that the various cylinders are all driven by intermeshing gears as shown, and the pitch line corresponds generally to the cylinder outline shown in FIG. 1. This train of gears receives its input from pinion 18 which is in turn driven through reduction gears 19 from pulley 16. The machine includes a sheet feeder mechanism (FIG. 1) indicated by the general reference numeral 20, driven by any suitable manner from the main part of the machine, and including sheet conveyor belts 22 (FIG. 2). Details of a suitable feeder mechanism for feeding sheets of material singly in succession are shown in the patent to Wood, 2,717,154, issued September 6, 1955.

The coating material is supplied from a suitable heated reservoir 25 through control valve 26 and discharge nozzle 28 to the coating cylinder 30 which is mounted for rotation about axis 31 in suitable eccentric mountings 32 (FIGS. 2 and 4). The coating cylinder 30 carries a coating plate 35 (FIGS. 2, 6 and 7), opposite ends of which are clamped beneath the filler 36 which is suitably bolted to the body of coating cylinder 30, thus presenting a continuous cylindrical surface. A doctor blade 40 carried in mountings 42, engages the surface of the plate 35 and filler 36, thus defining a pool of coating material 44 between the doctor blade and the coating cylinder, and the coating material is supplied to this pool from the supply source 25. The doctor blade may be heated, if desired, as by a suitable electric heater shown schematically at 43.

The plate 35, as shown particularly in FIGS. 6 and 7, includes grooves or carrier depressions 45 in the surface thereof. These depressions are provided in those areas of the plate intended to convey coating material to the sheets, and preferably extend at a slight angle with respect to the longitudinal axis of coating cylinder 30, as shown particularly in FIG. 6, to provide a satisfactory wiping action as the doctor blade passes over the depressions. Thus, the depressions pick up coating material from the pool 44 and carry the material under the doctor blade 40 for application to sheets supplied through the feeder mechanism 20. The raised or non-depressed sides of the plate are engaged by side blades 47, one of which is shown in FIG. 2, which also engage opposite ends of doctor blade 42 to confine the coating material.

The coating cylinder 30 preferably includes means for heating thereof to maintain the hot melt coating material in a fluid state. This means may be provided, for example, by an internal electrical heating element 50 energized from a suitable source of power which may include a conventional temperature control (not shown). For example, when coating with polyethylene, the cylinder surface is kept at an average temperature of about 325 to 350° F., since this material will solidify on cooling below its melting point, which is in the neighborhood of 212 to 215° F.

An impression cylinder 60 is mounted for rotation adjacent the coating cylinder 30, preferably on a fixed axis 62, and defining a nip 64 therebetween through which the sheets to be coated are fed. The cylinder 60 includes conventional grippers for engaging the leading edge of a single sheet passing from the feed mechanism 20 and clamping the leading edge to the impression cylinder to maintain registry thereof during passage through the nip. These grippers are essentially of conventional construction, for example of the type shown in the patent to Wood, 2,411,123 of November 12, 1946, and includes fingers 65 mounted on a cross shaft 66 which rotates about an axis fixed with respect to the center of cylinder 60. The fingers cooperate with pads 67 in the closed position thereof, shown in full lines in FIG. 2, to grasp the leading edge of a sheet 68 therebetween. The fingers 65 are pivoted to an open position to release the sheet and to prepare for acceptance of a following sheet, in known manner, and as more particularly described in the aforementioned Wood patent.

It should be noted, however, that in their gripping position fingers 65 are completely recessed with respect to the surface of impression cylinder 60, and thus the gripper structure may clear the surface of the coating cylinder, which must be continuous because of the coating supply arrangement, where the doctor blade 40 is continuously in contact with either the coating plate 35 or the surface of coating cylinder 30.

The impression cylinder 60 also may include structure for retaining suitable packing 70 extending over the active surface thereof, and retained adjacent the grippers by clamps 72 mounted to rotate with a clamping shaft 73. The tail end of the packing is received in a slot of a clamping bar 75 which may be rotated from one end by a suitable spanner or the like to provide proper tensioning in the packing, with the tightened position of the bar 75 maintained by the ratchet and pawl mechanism 76. This packing may be of any suitable material such as the tympan paper commonly used in letterpress printing, but preferably is a sheet of paper-like material coated with a substance from which the coating material may readily be removed after solidifying. One suitable such substance is a coating of polytetrafluoroethylene, known commercially as Teflon.

As explained at the beginning of the specification, the present apparatus may be used to coat the entire surface of sheets, or for so-called "spot coating" operations, where only a predetermined portion of the surface of the material is coated with the hot melt material. In such spot coating operations the plate 35 is provided with the carrier depressions 45 only in areas corresponding to those predetermined areas of each sheet to which the hot melt coating material is to be transferred. The configuration of the plate, particularly as shown in FIG. 7, in cooperation with the doctor blade 40, provides the requisite metering of the hot melt material such that precisely the right amount of material is deposited on each sheet, in the desired area, as the sheet passes through the nip 64.

Obviously, in lenticular coating particularly, it is necessary to obtain precise registry of the sheets, both front and side register, and for this purpose at the output of the sheet feeding mechanism there are front stops in the form of depending fingers 80 mounted on a rotatable cross shaft 82 which is oscillated in timed relation with the sheet feeding operation. The ends 84 of the fingers 80 provide the front stops which engage each sheet and position the leading edge thereof precisely prior to feeding thereof into the machine. Then, as the grippers 65 move past the feed station the cooperating rollers 87 are raised to press the sheet against the feed rollers 85, the fingers 80 are lifted and the feed rollers 85 are rotated to move the sheet accurately from the register position forward to bring its leading edge portion over pads 67, and the grippers 65 close on the leading edge of the sheet to maintain the sheet precisely in position on the cylinder 60 as the sheet is carried through the coating nip. Apparatus for performing such feeding function in timed relation with rotation of the cyinders is well known, and may be, for example, of the type shown in the patent to Harris, 1,307,969, issued June 24, 1919.

Conventional side register apparatus is also provided in the form of a cross bar 90 which oscillates transversely beneath the sheet in the feeding position, together with a roller 92 in the form of an idler which is lowered at the proper time to press the sheet against the bar 90 and cause it to be moved sidewise thereby against an adjustable side stop 95. The location of this stop may be controlled by a side adjustment screw having an outwardly extending adjustment head 96 rotatable by the operator. As each sheet is fed forward it passes beneath the guide shoe 97 and thus beneath roller 92. The roller 92 is then lowered and the bar 90 is then oscillated, to the left as shown in FIG. 3 to carry the sheet against the side stop 95 and position it accurately in proper side registered position.

A conventional detector 98 (FIG. 2) may be positioned adjacent the front stops 80 to detect the presence or absence of a sheet in feeding position. Such detector may be connected in a circuit which controls movement of the cylinders of the machine into and out of operative position, preferably operating to maintain them in operative position only when a sheet is present and operating to throw off the cylinders, moving them apart from each other at the various nips, when there is no sheet present for passage through the machine.

The sheet preferably is carried about the periphery of impression cylinder 60 only for a minimum distance consonant with placement of other parts of the machine. Thus, a further nip 100 is defined between impression cylinder 60 and a surfacing and cooling cylinder 105 which is mounted for rotation about axis 106 on eccentric mountings 107 (FIG. 4). The surfacing or embossing cylinder also is provided with gripping means, shown schematically in FIG. 2 as the gripper fingers 108 and cooperating pads 109. These grippers may be of the same construction as grippers 65 on the impression cylinder, but are arranged in slightly elevated relation with respect to the cylinder surface such that they engage the leading edge of a sheet just prior to its release by the aforementioned grippers on the impression cylinder as the sheet passes through nip 100. The grippers 108 thus maintain the registry of the sheet being coated during its further travel about the surfacing cylinder 105.

If it is desired to emboss a pattern into the still fluid coating material deposited upon the sheet, the cylinder 105 may carry upon its surface a pattern to be embossed into the coating material. For example, in the case of forming lenticular coatings, the surface of cylinder 105 may carry a thin metal plate 110 including a plurality of lenticulations 112 (FIGS. 8 and 9) which extend at a precise angular position, preferably normal, to the rotational axis of the impression cylinder, and in position to emboss the coated areas of the sheets. This plate is properly tensioned by the clamps 113 which grip the leading and trailing edges of the plate and tighten it over the surface of cylinder 105. The coated sheets are surfaced or embossed by plate 110 as they pass through nip 100, and are maintained in contact with plate 110 for a considerable part of a revolution of cylinder 105, preferably in excess of 180° of travel along the periphery thereof. In a typical embodiment of the apparatus, used for lenticular coating operations, the distance between the nip 100 and the next nip 115, defined by the surfacing cylinder 105 and a transfer cylinder 120, is between 180° and 270°, and as illustrated is approximately 250°.

During contact of the coated sheet with the surfacing cylinder, the coating is chilled to set or solidify it, and for this purpose the surfacing cylinder 105 may be provided with a means for cooling, including a tank 125 of coolant which may include suitable refrigerant equipment (not shown) therefor, together with connecting lines or pipes 127 for passing the coolant between the tank and the interior passages 128 of cylinder 105, and a pump 129 for circulating the coolant. In the case of coating with polyethylene cylinder 105 may advantageously be maintained at about 25° F., depending to some extent on thickness of the applied coating and speed of the machine.

The transfer cylinder 120 is carried on a shaft 130 and is also provided with gripping means in the form of gripping fingers 135 and cooperating pads 136, shown in FIG. 2, which grip a leading edge of each sheet as it is transferred from the surfacing cylinder and maintain proper registry of each sheet as it is transferred to a delivery mechanism, including a skeleton cylinder 140 having sprockets at its ends around which chains 142 of a delivery conveyor are threaded. The conveyor, which is of conventional construction as known in the prior art, includes suitable grippers 145 which pick off the leading edge of the sheet as it is released from the transfer cylinder and carry the sheet over to the end of the delivery mechanism, generally below a sprocket 147, where the grippers 145 are released to drop the sheet into a pile 148 (FIG. 1).

Arrangement of the cylinders 105, 120 and 140 is preferably such that the leading edge of the sheet will be conveyed at constant speed equal to the speed of the surface of cylinder 105, until the tail end of the sheet has left the latter cylinder. This arrangement facilitates removal of the sheets and avoids any sharp bending thereof on leaving cylinder 105.

It is important to maintain a precisely defined spacing or clearance at nips 64 and 100. This affords close control over the pressure exerted upon the still fluid coating as it is deposited on the sheet material at nip 64 and as it passes through the surfacing nip 100. The necessary control at these nips, as well as at the nip 115, is provided by adjustment of the control rods 150 and 152 (FIG. 4) which are connected at both sides of the machine between the eccentric mountings 32 and 107 and stationary points on the machine frame so as to define the position of the axes of the coating and surfacing cylinders, respectively. Further control of spacing and pressure is provided by using packing 70 of various thicknesses.

Such close control of cylinder spacing and surface pressure at nips 64 and 100 enables transfer of the precise amount of coating material desired to the sheet material, and the maintenance of the precise thickness and surface character desired, while avoiding undue squeezing or carryback of the fluid coating.

Referring to FIGS. 4 and 5, it is desirable to provide a detection and "throw-off" system for protection of the relatively thin coating and embossing plates, avoidance of application coating to the bare impress cylinder surface. For example, a ball-up of sheet material or the like in the nips 64, 100 and 115, or an ineffective release of a sheet from the cylinder 105 might result in crushing or other damage to the plates.

Thus, the detector 98 will energize a circuit in response to absence of a sheet at this point. Likewise, a further detector 155 of this type is supported adjacent the nip between surfacing cylinder 105 and transfer cylinder 120, on the side thereof where sheets normally are transferred to the transfer cylinder.

In operation of the apparatus, a cam 160 is continuously rotated in proper synchronism with rotation of the various cylinders and operation of the sheet feeder to move the cylinders into operative position. Mechanism of this type is well known, and comprises a follower 162 mounted on a pivot arm 163 and operable to reciprocate an arm 165 which engages a lug 166 on a crank member 168 controlling the rotating of the eccentric mounting 32 of the coating cylinder.

Thus, as the apparatus begins operation, the coating cylinder is translated slightly about its eccentric mountings into operating position to apply the proper pressure to the sheet passing between the coating cylinder and the impression cylinder. Due to the arrangement of the linkage, it will remain in this position unless disturbed. In the event of an abnormal condition sensed by the detectors 98 or 155, a throw-off solenoid 170 will be energized, as through a conventional circuit (not shown), and this solenoid is connected to the throw-off arm 165 by rod 172 to swing that arm out of contact with the lug 166, and into contact with lug 173 on crank 168, reversing the effect of the connecting linkage between the cam follower 162 and the eccentric mounting 32, and moving the coating cylinder to release the pressure between it and the impression cylinder. Preferably, the detector is also connected in any suitable manner to stop operation of the sheet feeder mechanism 20 until the operator has an opportunity to clear the machine.

FIGS. 10 and 11 illustrate a type of coating operation to which the invention is particularly adapted. These figures show a plan and an end view of a preprinted sheet to which a transparent lenticular coating has been applied, with the lenticles 200 (FIG. 10) in precise alignment with the printed matter. By providing such a precisely coated product the present invention makes the lenticular process of three-dimensional illustration commercially feasible.

The foregoing apparatus has been described particularly with reference to coating of separate sheets of material such as paper or paperboard. It should be understood, however, that the principles involved in such apparatus may also be applied to the construction of machines for coating a continuous web of sheet material, particularly where it is desired to provide spot or area coating on web material which might be preprinted. In such apparatus the sheet feeding mechanism would of course not be required, nor would the grippers and the front guide register or stop mechanism be needed. However, suitable apparatus would be employed to maintain accurate side register, and the general arrangement of the coating, impression, and surfacing cylinders should be maintained for proper results. Also, the means for forming a pool of hot melt coating material including the heated doctor blade, would be employed, and in the case of hot melt material such as polyethylene the coating cylinder would be heated as previously described and the surfacing or embossing cylinder would be cooled so as to chill the coating and set it before the material had passed from contact with the surfacing cylinder.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for applying a coating to predetermined areas of material comprising a frame, an impression cylinder mounted in said frame, a coating cylinder mounted parallel to said impression cylinder cooperating therewith defining a nip through which the material is passed, means on the surface of said coating cylinder including carrier depressions in said surface thereof defining the area of coating to be applied, means for supplying a hot melt coating material to the surface of said coating cylinder, doctor means contacting said coating cylinder in advance of said coating nip for clearing the melt therefrom except in said depressions, a surfacing cylinder mounted parallel to said impression cylinder and cooperating therewith defining a nip relatively closely spaced with respect to said coating nip, means for cooling said surfacing cylinder providing for chilling of the coating deposited on the material, means including a transfer cylinder supported in cooperating relation with said surfacing cylinder at a substantial angular spacing from said nip between said impression cylinder and said surfacing cylinder to maintain the coated material wrapped on said surfacing cylinder over a substantial portion of the peripheral surface thereof and then to remove the material from said surfacing cylinder, and drive means rotating each said cylinder at speeds producing substantially equal peripheral speeds of said cylinders.

2. Apparatus for applying a coating to predetermined areas of material comprising a frame, an impression cylinder mounted in said frame, a coating cylinder mounted parallel to said impression cylinder for contact therewith defining a nip through which the material is passed, a removable plate on the surface of said coating cylinder including carrier depressions in portions of said plate thereof defining the area of coating to be applied, means supplying a hot melt coating material to the surface of said plate, doctor means contacting said coating cylinder in advance of said coating nip for clearing the melt therefrom except in said depressions, a surfacing cylinder mounted parallel to said impression cylinder and defining therewith a nip relatively closely spaced with respect to said coating nip, a removable surfacing plate covering said surfacing cylinder, means for cooling said surfacing cylinder providing for chilling of the coating deposited on the material, and means for removing coated material from said surfacing cylinder including a transfer cylinder supported for contact with said surfacing cylinder at a substantial angular spacing in excess of 180° from said nip between said impression cylinder and said surfacing cylinder to maintain the material wrapped on said surfacing cylinder over a substantial portion of the peripheral surface thereof.

3. Apparatus for applying a coating to predetermined areas of sheet material comprising a frame, feeding mechanism on said frame supporting sheets to be coated and including means for discharging the sheets in succession, and impression cylinder mounted in said frame to receive sheets discharged from said feeding mechanism, means on said impression cylinder for grasping edge portions of each sheet to register the sheet on said cylinder for travel therewith, a coating cylinder mounted parallel to said impression cylinder and defining therewith a nip through which the sheets are passed, means on the surface of said coating cylinder including carrier depressions in portions of said surface thereof defining the area of coating to be applied, means supplying a hot melt coating material to the surface of said coating cylinder, doctor means contacting said coating cylinder in advance of said coating nip for clearing the melt therefrom except in said depressions, a surfacing cylinder mounted parallel to said impression cylinder and defining therewith a nip relatively closely spaced with respect to said coating nip, means for cooling said surfacing cylinder providing for chilling of the coating deposited on said sheets, and transfer means operatively associated with said surfacing cylinder for accepting coated sheets therefrom and discharging the sheets from the apparatus.

4. Apparatus for supplying a hot melt coating to sheets of material, comprising a frame, feeding mechanism on said frame for discharging single sheets in succession, an impression cylinder mounted adjacent the discharge of said feeding mechanism, gripping means on said impression cylinder arranged to grasp the leading edge of a sheet and register said sheet on said cylinder, a coating cylinder mounted parallel to said impression cylinder and defining therewith a coating nip through which the sheets are passed, means supplying a hot melt coating material to the surface of said coating cylinder, means for heating said coating cylinder to prevent adhesion of said coating material thereto, doctor means contacting said coating cylinder for forming a coating of substantially uniform thickness to be carried to said nip and applied to a sheet passing therethrough, a surfacing cylinder, means supporting said surfacing cylinder on said frame parallel to said impression cylinder defining a nip therewith spaced from the nip of said coating cylinder by a distance along the circumference of said impression cylinder substantially less than the length of a sheet, means for cooling said surfacing cylinder to chill the deposited coating on the sheets, and transfer means arranged to accept the coated sheets from said surfacing cylinder including a cylinder supported in contact with said surfacing cylinder at a substantial angular spacing from said coating nip for maintaining each sheet wrapped on said surfacing cylinder in contact therewith to set the coating thereon.

5. Apparatus for applying a lenticular coating over printed matter on sheet material, comprising feeding mechanism for guiding the material into said apparatus, an impression cylinder mounted adjacent the discharge of said feeding mechanism, gripping means on said impression cylinder arranged to grasp the leading edge of a sheet and register the sheet on said cylinder, a coating cylinder mounted closely adjacent said impression cylinder and defining therewith a coating nip through which the sheets are passed, a plate on the surface of said coating cylinder having carrier depressions at certain portions of the surface thereof defining the area of coating to be applied, means supplying a hot melt coating material to the surface of said plate, means for heating said plate to prevent adherence of said coating material thereto, doctor means contacting the entire width of said plate in advance of said nip for clearing the melt therefrom except in said depressions, an embossing cylinder having a surface defining the lenticular pattern, means supporting said embossing cylinder closely adjacent said impression cylinder defining a nip therewith spaced from said coating nip by a distance along the circumference of said impression cylinder less than the length of a sheet, means for cooling said embossing cylinder to chill the coating while in contact with said embossed surface for setting the coating material in the embossed lenticular pattern, and transfer means operatively associated with said embossing cylinder for accepting a coated sheet therefrom and discharging the sheets from the apparatus.

6. Apparatus for applying a lenticular coating over printed matter on sheets of material, comprising feeding mechanism for discharging the printed sheets in succession, an impression cylinder mounted adjacent the discharge of said feeding mechanism, gripping means on said impression cylinder arranged to grasp the leading edge of a sheet and register the sheet on said cylinder, a coating cylinder mounted closely adjacent said impression cylinder and defining therewith a coating nip through which the sheets are passed, a plate on the surface of said coating cylinder having carrier depressions at certain portions of the surface thereof defining the area of coating to be applied, means supplying a hot melt coating material to the surface of said plate, means for heating said plate to prevent adherence of said coating material thereto, doctor means contacting the entire width of said plate in advance of said nip for clearing the melt therefrom except in said depression, an embossing cylinder having a surface defining the lenticular pattern, means supporting said embossing cylinder adjacent said impression cylinder defining a nip therewith spaced from said coating nip by a distance along the circumference of said impression cylinder substantially less than the length of a sheet, means for cooling said embossing cylinder to chill the coating while in contact with said embossed surface for setting the coating material in the embossed lenticular pattern, and transfer means operatively associated with said embossing cylinder for accepting a coated sheet therefrom and discharging the sheets from the apparatus, said transfer means being supported adjacent said embossing cylinder at a distance spaced around the circumference thereof from said nip with said impression cylinder substantially the full length of said sheets in the direction of travel through said apparatus for maintaining said sheets wrapped on said embossing cylinder over substantially the full length thereof during the embossing operation.

7. Apparatus for applying a lenticular coating over printed matter on sheets of material, comprising feeding mechanism for discharging the printed sheets in succession, an impression cylinder mounted adjacent the discharge of said feeding mechanism, gripping means on said impression cylinder arranged to grasp the leading edge of a sheet and register the sheet on said cylinder, a coating cylinder mounted adjacent said impression cylinder and defining therewith a coating nip through which the sheets are passed, a plate on the surface of said coating cylinder having carrier depressions in certain portions of the surface thereof defining the area of coating to be applied, means supplying a hot melt coating material to the surface of said plate, doctor means contacting the entire width of said plate in advance of said nip for clearing the melt therefrom except in said depressions, an embossing cylinder having a surface defining the lenticular pattern, means supporting said embossing cylinder adjacent said impression cylinder defining a nip therewith spaced from said coating nip by a distance along the circumference of said impression cylinder less than the length of a sheet, and transfer means operatively associated with said embossing cylinder for accepting coated sheets therefrom and discharging the sheets from the apparatus.

8. Apparatus for applying a hot melt type of coating over predetermined areas of sheets of material, comprising a frame, an impression cylinder mounted on said frame, feeding mechanism adjacent said impression cylinder including means for feeding single sheets thereto, gripper means on said impression cylinder arranged to engage the leading edge of each sheet fed thereto and to register the sheet on said cylinder, a coating cylinder mounted in said frame next to said impression cylinder and defining therewith a coating nip through which the sheets are passed, said coating cylinder having surface portions thereof provided with carrier depressions corresponding to the areas to be coated on each sheet, means providing a supply of hot melt coating material to said surface of said coating cylinder in advance of said nip, a doctor blade mounted to engage said coating cylinder between said nip and said melt supply for wiping said coating cylinder surface to leave a quantity of coating material only in said carrier depressions for transfer to a sheet at said nip, a surfacing cylinder supported on said frame adjacent said impression cylinder and spaced angularly around said impression cylinder from said coating cylinder to receive coated sheets from said nip, gripper means on said surfacing cylinder adapted to take sheets from said impression cylinder and to maintain proper registry thereof, means for cooling said surfacing cylinder to chill the deposited coating on the sheets, and transfer means arranged to take the coated sheets positively from said surfacing cylinder including a transfer cylinder supported adjacent said surfacing cylinder at a substantial angular spacing in excess of 180° from the contact of said surfacing and impressing cylinders providing for substantial travel of the sheets in contact with said cooled surfacing cylinder.

9. Apparatus for applying a coating to the surface of flexible sheets of material to be coated, comprising an impression cylinder, grippers on said impression cylinder arranged to grasp a sheet presented to the grippers and carry it partly around said cylinder, means for feeding sheets one at a time to said impression cylinder in register therewith, means for applying a hot melt coating material in predetermined quantity to the surface of a sheet on said impression cylinder, a surfacing cylinder having a surface of predetermined character, means supporting said surfacing cylinder closely adjacent said impression cylinder defining a coating nip therewith spaced forward with respect to the direction of forward travel from said hot melt applying means, the spacing of said impression cylinder and said surfacing cylinder being such that a coated sheet is pressed between the surfaces thereof with a predetermined pressure at said nip, means for cooling said surfacing cylinder to chill the coating while in contact with the surface thereof for setting the coating with a surface corresponding to the surface of said surfacing cylinder, grippers on said surfacing cylinder arranged to take the leading edge of a sheet from said grippers of said supporting cylinder and to carry said sheet partly around said surfacing cylinder in registry therewith, transfer means operatively associated with said surfacing cylinder and for taking a coated and surfaced sheet therefrom and conveying the sheet toward a delivery point at a speed substantially equal to the speed of the sheet on said surfacing cylinder at least until the tail end of the sheet has cleared said surfacing cylinder, and means for driving said cylinders and said transfer means in directions appropriate to convey sheets through said apparatus including operators for said grippers to grip and release the sheets in timed relation to passage thereof about said cylinders.

10. Apparatus for applying a lenticular coating to the surface of flexible sheets of material to be coated, comprising an impression cylinder, grippers on said cylinder arranged to grasp a sheet presented to the grippers and carry it partly around said cylinder, means mounting said grippers in recessed relation with respect to the surface of said impression cylinder, means for feeding sheets one at a time to said impression cylinder in register therewith, a coating cylinder adapted to apply a hot melt coating material in predetermined quantity to the surface of a sheet on said impression cylinder, an embossing cylinder having a lenticular surface, means supporting said embossing cylinder closely adjacent said impression cylinder defining a nip therewith spaced forward with respect to the direction of forward travel from said coating cylinder, the spacing of said impression cylinder and said embossing cylinder being such that a coated sheet is pressed between the surfaces thereof with a predetermined pressure at said nip, means for cooling said embossing cylinder to chill the coating while in contact with the surface thereof for setting the coating with a lenticular surface, grippers on said embossing cylinder arranged to take the leading edge of a sheet from said grippers of said impression cylinder and to carry said sheet partly around said embossing cylinder in registry therewith, transfer means operatively associated with said embossing cylinder for taking a coated and surfaced sheet therefrom and conveying the last toward a delivery point at a speed substantially equal to the speed of the sheet on said embossing cylinder at least until the tail end of the sheet has passed from said embossing cylinder and means for driving said cylinder and said transfer means in directions appropriate to convey sheets through said apparatus including operators for said grippers to grip and release the sheets in timed relation to passage thereof about said cylinders.

11. Apparatus for applying a coating to sheet material comprising a frame, an impression cylinder mounted in said frame, a coating cylinder mounted parallel to said impression cylinder in cooperative relation thereto for contact with material passing over said impression cylinder, means on the surface of said coating cylinder including carrier depressions in said surface thereof defining the area of coating to be applied, means for supplying a normally solid coating material in hot melt liquid form to the surface of said coating cylinder, doctor means contacting said coating cylinder in advance of the point of engagement thereof with the material for clearing the melt therefrom except in said depressions to meter the amount of coating applied to the material, a surfacing cylinder mounted parallel to said impression cylinder and receiving the material directly therefrom with the coated surface in position for direct contact with said surfacing cylinder, means for cooling said surfacing cylinder to chill the coating deposited on said material, and transfer means cooperating with said surfacing cylinder to remove the coated material from said surfacing cylinder at a substantial angular spacing around said surfacing cylinder from the point of initial contact between the coated material and said surfacing cylinder to maintain said coated material in contact with said surfacing cylinder for a period of time sufficient to assure essentially complete solidification of the coating before the coated material is removed by said transfer means.

12. Apparatus for applying a coating to sheet material comprising a frame, an impression cylinder mounted in said frame, a coating cylinder mounted parallel to said impression cylinder in cooperative relation thereto defining a nip through which the material is passed, means on the surface of said coating cylinder including carrier depressions in said surface thereof defining the area of coating to be applied, means for supplying a normally solid coating material in hot melt liquid form to the surface of said coating cylinder, doctor means contacting said coating cylinder in advance of said coating nip for clearing the melt therefrom except in said depressions, a surfacing cylinder mounted parallel to said impression cylinder and receiving the material directly therefrom with the coated surface in position for direct contact with said surfacing cylinder, means for cooling said surfacing cylinder to chill the coating deposited on said material, transfer means cooperating with said surfacing cylinder to remove the coated material from said surfacing cylinder at a substantial angular spacing around said surfacing cylinder from the point of initial contact between the coated material and said surfacing cylinder assuring essentially complete solidification of the coating while in contact with said surfacing cylinder, and means controlling the spacing between said surfacing and impression cylinders providing for control of the pressure exerted on the coated material during passage therebetween.

13. Apparatus for applying a coating to predetermined areas of material comprising a frame, an impression cylinder mounted in said frame, a coating cylinder mounted parallel to said impression cylinder cooperating therewith defining a nip through which the material is passed, means on the surface of said coating cylinder including carrier depressions in said surface thereof defining the area of coating to be applied, means for supplying a normally solid coating material in viscous hot melt liquid form to the surface of said coating cylinder, doctor means contacting said coating cylinder in advance of said coating nip for clearing the liquid state material therefrom except in said depressions to meter the amount of coating applied to the material, a surfacing cylinder mounted parallel to said impression cylinder and receiving coated material directly from said nip means for cooling said surfacing cylinder providing for chilling of the coating deposited on the material, means including a transfer cylinder supported in cooperating relation with said surfacing cylinder at a substantial angular spacing from the nip between said impression cylinder and said surfacing cylinder to maintain the coated material wrapped on said surfacing cylinder over a substantial portion of the peripheral surface thereof for essentially complete solidification of the coating and then to remove the material from said transfer cylinder, and drive means rotating each of said cylinders at speeds producing substantially equal peripheral speeds of said cylinders.

14. Apparatus for applying a flexible coating to individual sheets of sheet material comprising a frame, means on said frame for supporting a stack of sheets to be coated, means for feeding the sheets one at a time from the stack and registering each sheet, an impression cylinder rotatably mounted in said frame and having means thereon arranged to move the registered sheets and to carry the sheets thereon in precise registry, means for applying to each sheet carried by said impression cylinder a predetermined quantity of normally solid hot melt coating material, a surfacing cylinder mounted parallel to said impression cylinder and arranged to receive the sheets directly from said impression cylinder with the coated surface in position for direct contact with said surfacing cylinder, means on said surfacing cylinder for holding the sheets thus received in precise registry thereon, said surfacing cylinder including a continuous surface area extending about a portion of its periphery corresponding to the area of the sheets to be coated and with which each coated sheet comes into contact, means cooling said surfacing cylinder to chill the melt coating deposited on the sheets by reason of contact between the said surfacing area and the coating, transfer means cooperating with said surfacing cylinder to remove the sheets therefrom and positioned with respect to said surfacing cylinder and the nip between said surfacing cylinder and said impression cylinder such that the coated sheets remain in contact with the surfacing cylinder over a major portion of a revolution thereof to assure substantial solidification of the coating before the coated sheets are removed from said surfacing cylinder, and means controlling said transfer means to maintain the speed of a sheet transferred thereto from said surfacing cylinder at a speed substantially equal to the peripheral speed of said surfacing cylinder until the tail end of the sheet passes from said surfacing cylinder.

15. A method of applying normally solid plastic coating material to sheet material such as paper, comprising the steps of supplying the coating material in bulk form and heating it to in excess of its melting point thereby reducing the coating material to a viscous hot liquid state, applying the hot liquid coating material to a traveling coating member having depressions of predetermined dimensions on the surface thereof to which the coating material is applied, wiping such surface level with the top of the depressions to leave a predetermined amount of the viscous liquid material in the depressions, moving such surface of the coating member into contact with sheet material to be coated and moving the sheet material at the region of contact with the coating member at the same surface speed as the coating member to transfer the viscous coating material from the depressions to the sheet material by pressure contact, conveying the sheet material with the liquid coating material thereon away from the coating member and into contact with a cooled surfacing member of predetermined configuration, pressing the coated material against said surfacing member to spread and meter the hot liquid coating material over a predetermined area of the sheet material and to a predetermined thickness and simultaneously commencing cooling of the hot liquid coating material during the metering step by reason of the contact of the coating material with the cooled surfacing member, maintaining the coated area of the sheet material in contact with the cooled surfacing member for a time sufficient to cause essentially complete solidification of the coating material, removing the sheet material from the surfacing member at the same surface speed as the surfacing member until at least the coated area of the sheet material is completely removed from the surfacing member, and delivering the coated sheet material to a delivery station with a solid flexible coating of predetermined thickness thereon.

16. The method defined in claim 15 including the additional step of embossing a pattern into the coating material during said cooling step to impart a predetermined surface configuration to the solidified coating material.

17. The method defined in claim 15 including the additional step of resiliently supporting the sheet material during contact thereof with the coating member and transferring of hot liquid coating material to the sheet material from the depressions of the coating member.

References Cited by the Examiner

UNITED STATES PATENTS

| | | | |
|---|---|---|---|
| 249,429 | 11/1881 | Walton | 117—11 |
| 2,089,524 | 8/1937 | Abrams et al. | 118—202 X |
| 2,100,712 | 11/1937 | Emmey. | |
| 2,117,200 | 5/1938 | Miller | 118—69 X |
| 2,219,158 | 10/1940 | Van Benschoten | 88—29 |
| 2,312,927 | 3/1943 | Murray | 118—101 |
| 2,531,036 | 11/1950 | Goettsch | 118—212 |
| 2,711,132 | 6/1955 | Viscardi. | |
| 2,753,275 | 7/1956 | Wiles et al. | 117—64 |
| 2,839,025 | 6/1958 | Burke et al. | 118—69 |
| 2,877,140 | 3/1959 | Olstad | 117—103 |
| 2,912,347 | 11/1959 | Yezek et al. | 117—64 |

FOREIGN PATENTS 688,637   3/1953   Great Britain.

ALFRED L. LEAVITT, *Primary Examiner.*

JOSEPH B. SPENCER, RICHARD D. NEVIUS,
*Examiners.*

RALPH S. KENDALL, S. H. COHEN, R. E. ZIMMERMAN, *Assistant Examiners.*

UNITED STATES PATENT OFFICE
CERTIFICATE OF CORRECTION

Patent No. 3,317,334                                      May 2, 1967

Robert K. Norton

It is hereby certified that error appears in the above numbered patent requiring correction and that the said Letters Patent should read as corrected below.

Column 8, line 28, for "and" read -- an --; column 11, line 37, for "last" read -- sheet --; line 41, for "cylinder", first occurrence, read -- cylinder, --; same line 41, for "cylinder", second occurrence, read -- cylinders --; column 12, line 10, for "thereform" read -- therefrom --; line 41, for "nip" read -- nip, --.

Signed and sealed this 21st day of November 1967.

(SEAL)
Attest:

Edward M. Fletcher, Jr.                            EDWARD J. BRENNER
Attesting Officer                                      Commissioner of Patents